Oct. 25, 1927.
F. BARNES
1,646,678
AUTOMOBILE SIGNAL
Filed March 26, 1926　　2 Sheets-Sheet 1
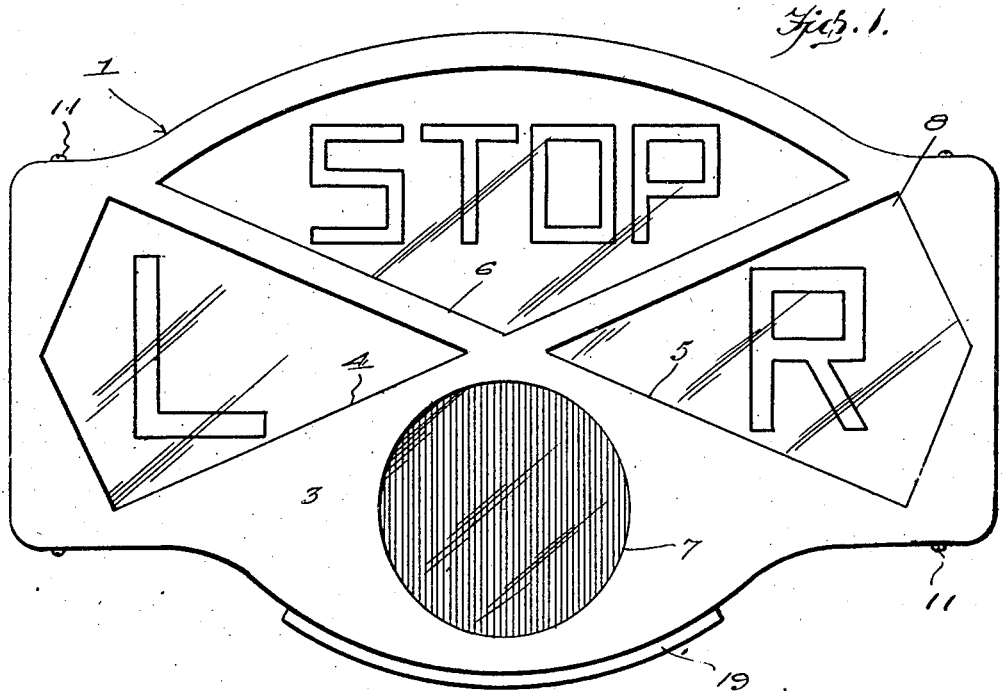
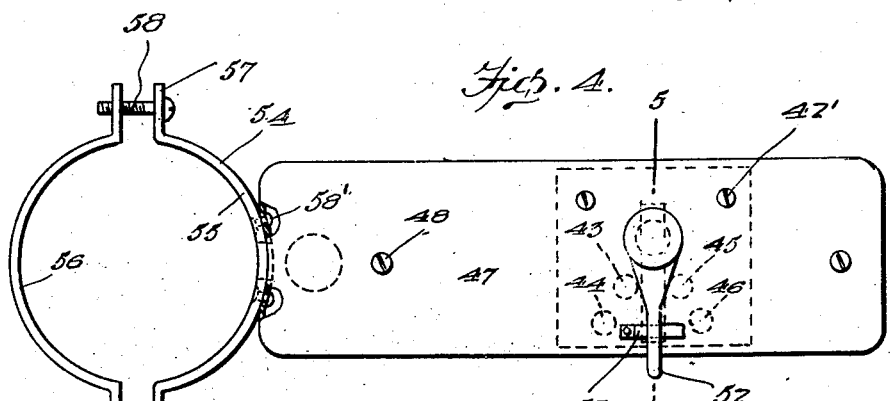
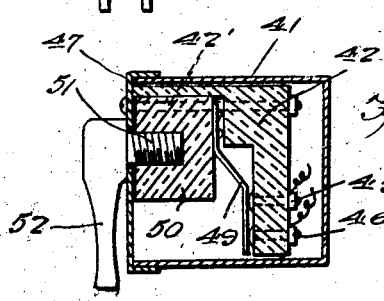
Inventor
F. Barnes
By Clarence A. O'Brien
Attorney Oct. 25, 1927.

F. BARNES 1,646,678

AUTOMOBILE SIGNAL

Filed March 26, 1926  2 Sheets-Sheet 2

Inventor
F. Barnes
By Clarence A. O'Brien
Attorney

Patented Oct. 25, 1927.

1,646,678

UNITED STATES PATENT OFFICE.

FRANK BARNES, OF COLUMBUS, OHIO.

AUTOMOBILE SIGNAL.

Application filed March 26, 1926. Serial No. 97,635.

The present invention relates to improvements in automobile signals and has for its principal object to provide a novel, yet simple device which may be readily and easily attached on an automobile for the purpose of indicating to approaching as well as pursuing vehicles, the direction or course which is to be followed by the vehicle on which the signal is mounted.

Another important object of the invention is to provide an automobile signal wherein means is provided for illuminating the desired signal, the control means for said means being arranged in close proximity to the operator of the vehicle so that the operator can readily and easily actuate the same without necessitating the removal of the hands from the steering wheel.

A still further object is to provide an automobile signal of the above mentioned character which will at all times be positive and efficient in carrying out the purposes for which it is designed, the same being further simple in construction, inexpensive, strong and durable and further well adapted to the purpose for which it is designed, Other objects and advantages of the invention will become apparent during the course of the following description taken in connection with the accompanying drawing.

In the accompanying drawing forming a part of this application and in which like numerals designate like parts throughout the same:

Figure 1 is a front elevation of the automobile signal embodying my invention.

Figure 4 is a plan view of the switch mechanism forming a part of the present invention, and Figure 5 is a vertical sectional view taken approximately on line 5—5 of Figure 4.

Figure 2:
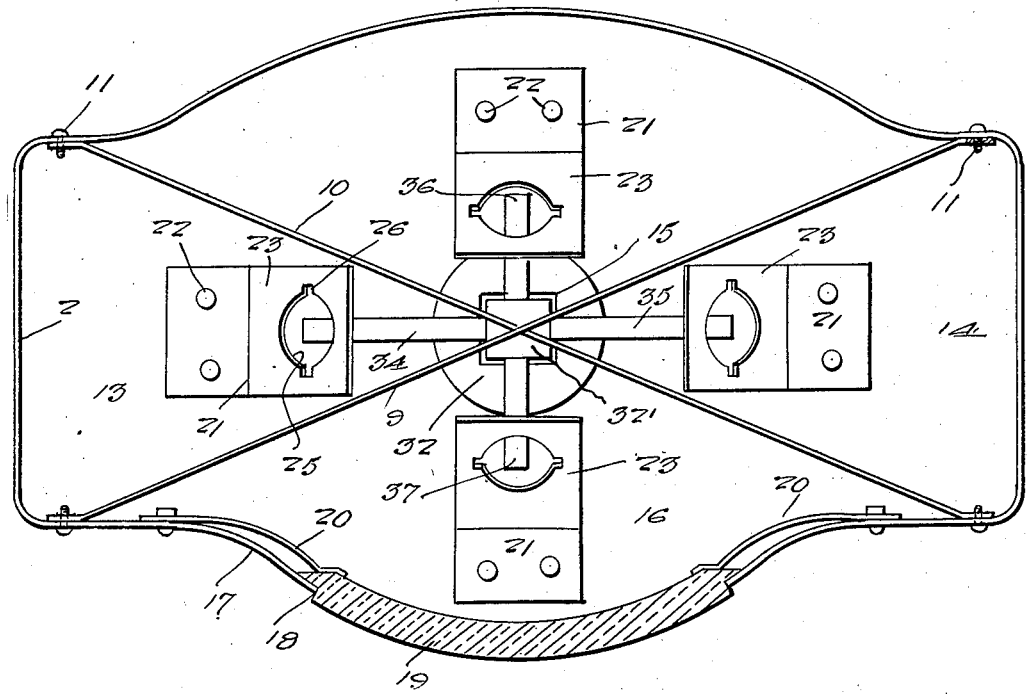
Figure 2 is a similar view with the face plate and the transluscent panel removed.

In the drawings wherein for the purpose of illustration is shown the preferred embodiment of my invention, the numeral 1 designates generally my improved automobile signal, the same comprising the casing 2 which may be of any desired shape, preferably such as is illustrated in the drawing, the front face of which is opened. A flanged front or face plate 3 provides a cover for the open front of the casing and this face plate is also of substantially the same configuration as the casing.

The face plate 3 is provided with the side cut out portions 4 and 5 respectively, and the top and bottom cut out portions 6 and 7 respectively. The purpose of this particular construction will be presently apparent. A translucent glass panel 8 is adapted to be disposed in the front face of the casing and is held in clamped engagement between the forward edges of the casing and the inner side of the face plate in the manner clearly shown in Figure 3. If desired, felt strips may be associated with the casing and the translucent glass panel for preventing any possibility of the glass panel becoming broken.

This translucent glass panel 8 is preferably colored red, and the portion of the panel which is disposed behind the cut out portion 4 of the face plate 3 has painted thereon in black, the letter "L" which is indicative of a left hand turn. The letter "R" is painted in black on the portion of the panel which is located directly adjacent the cut out portion 5 and this letter "R" is indicative of a right hand turn.

The word "STOP" is painted in black on the portion of the glass panel which is behind the cut out portion 6, and that portion of the panel which is disposed behind the cut out portion 7 will represent a tail light.

A pair of intersecting partition plates 9 and 10 respectively are arranged within the casing, and the ends of these plates are secured to the blottom and top of the casing adjacent the sides or ends thereof as illustrated at 11 to provide the four compartments, 13, 14, 15 and 16, respectively. These partition plates are of such width as to have their forward edges abutting the inner face of the translucent glass panel 8, the opposite edges of the partition plate being adapted to engage the inner face of the rear wall of the casing. This construction is more clearly shown in Figure 3 of the drawings.

As is more clearly shown in Figure 2, the bottom 17 of the casing 2 is provided with a centrally located opening 17 in which is disposed the transparent member 19, suitable retaining clips 20 being provided for clamping the transparent members 19 in position within the opening 18. The purpose of this transparent member 19 is to provide a means whereby the license plate may be illuminated by the same source of light which is employed as a tail light.

An angular bracket such as is shown at 21 is arranged in each compartment and the base portion of each bracket is adapted to be secured to the rear wall of the casing 2 by any appropriate fastening means such as is shown at 22. The forwardly projecting portion 23 of each angular bracket is disposed at such an angle as to cause the forward free end portions of the several brackets to gradually converge toward the center of the casing as is readily obvious from the construction shown in Figure 2.

Each of the inclined forwardly disposed portions 23 of the angular brackets is provided with an opening 25, and cooperating with the opening in each of said brackets are the diametrically disposed slots or notches 26. The opening 25 provides a means for receiving the base or plug 24 of an electric lamp 27 and laterally projecting pins 28 are associated with the plug or base 24 of each of the lamps for cooperation with the forwardly disposed portion 23 of each of the angular brackets in securing the lamp in proper position in each of the compartments, the diametrically opposed slots or notches 26 cooperating with the pin 28 to provide a means whereby the lamps may be readily disengaged from their respective supporting brackets. By constructing the angular brackets in the manner as above described, the illuminating means for the respective compartments will be disposed in the position shown more clearly in Figure 3, so that the several electric lamps will be disposed radially within the casing.

The manner in which the current is delivered to the several lamps will now be specifically described. A central opening 29 is formed in the rear wall of the casing 2.

A socket member 31 is pressed through the opening 29 and is provided with a shoulder 30 on the forward end portion thereof. This shoulder is adapted to fit against the rear wall of the casing. A plug of insulated material and designated by the numeral 32 is fitted in the forward end of the socket 31 and this plug is provided with a central opening which is substantially rectangular for a purpose to be presently described. An annular flange 33 is formed on the plug 32 and engages the forward edge of the socket member 31 and the shoulder 30.

Four spring contact arms designated by the numerals 34, 35, 36 and 37, respectively have their inner ends extending into the opening formed in the plug 32 and are held in position therein through the medium of the pivot plug 32' which is adapted to fit in the opening formed in the plug 32. The extreme inner ends of the contact arms are disposed laterally so as to lie substantially flush with the outer face of the plug 32' as well as the plug 32.

The outer ends of these spring contact arms extend laterally from the plug 32 and as is clearly shown in Figure 2, the spring contact arms 34 and 35 extend into the compartments 13 and 14, while the opposite pair of spring contact arms 36 and 37 extend into the upper and lower compartments 15 and 16 respectively. The outer ends of the several spring contact arms are bent rearwardly and are disposed directly behind the openings 25 formed in the respective angular brackets 21 so that the outer ends of the spring contact arms will be held in engagement with the contacts of the respective plugs of the electric lamps 27 as shown at 38, with reference more particularly to Figure 3.

Figure 3:
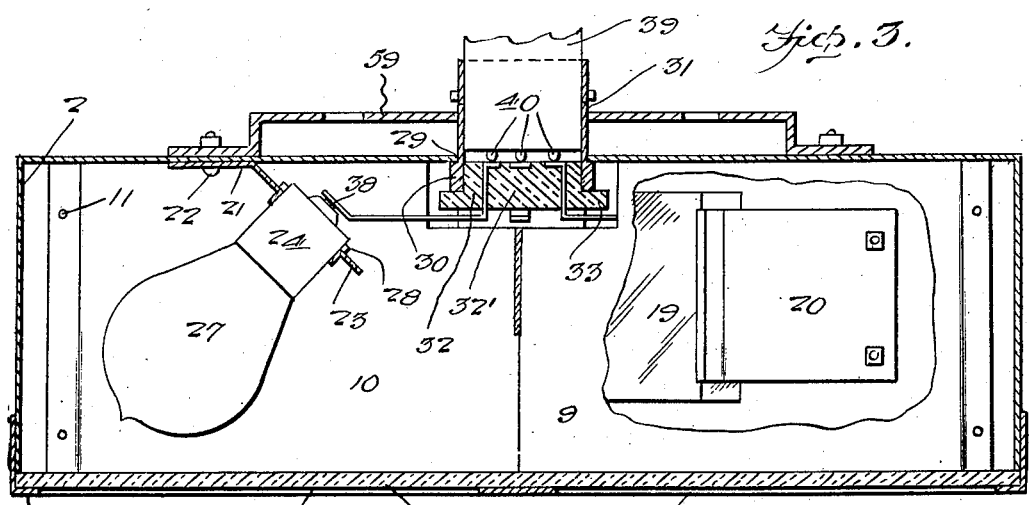
Figure 3 is a view partly in elevation and partly in section showing the arrangement of the contacts which are associated with the lamp in the respective compartments. and further showing the partition plate arranged within the casing.

A plug 39 is detachably secured in the outer end of the socket 31 and carries four contact members shown at 40 which contact members are adapted for engagement with the lateral disposed portions of the inner ends of the several spring contact arms in the manner as also more clearly shown in Figure 3, and this plug 39 is connected with any suitable source of supply in the manner well known in the art.

The electric lamps arranged in the compartments 15 and 16 are adapted to be illuminated by the usual switch mechanism provided therefor on an automobile. For the purpose of controlling the illumination of the electric lamps arranged in the compartments 13 and 14, respectively, I have provided a novel switch mechanism, the construction of which will now be described.

The substantially rectangular shaped casing 41 has its top face open, and arranged therein is the insulated block 42. The securing means for the block is shown at 42'. This block carries the pairs of cooperating contacts 43 and 44, and 45 and 46 respectively. The pair of contacts 43 and 44 cooperate with the electric lamp in the compartment 13 whereas the other pair of contacts 45 and 46 are provided for the electric lamps in the compartment 14. A suitable cover 47 is provided for the top open face of the casing 41 and may be secured in proper position by any appropriate fastening means such as is shown at 48.

Adapted for cooperation with the contacts carried by the insulated blocks 42 is the switch arm 49. One end of this switch arm is secured to the inner face of the insulated carrier member 50 and the latter is adapted to be carried by the inner end of the screwthreaded shank 51, an actuating lever 52 being associated with the outer end of said threaded shank, which lever is arranged above the top 47 of the casing 41 and it is readily obvious that when the lever 52 is swung in one direction, the switch arm 49 will bridge the contacts 43 and 44 so as to close the circuit to the lamp within the compartment 13, thus illuminating the letter "L" to indicate that a left hand turn is about to be made. Manifestly by swinging the switch arm 49 so that the same is brought into bridging relation with respect to the contacts 45 and 46, the electric lamps in the compartment 14 will be illuminated and thus illuminate the letter "R" to show that a right hand turn is about to be made.

For the purpose of normally maintaining the lever 52 in the position so that the switch arms 49 is out of engagement with either pair of contacts, I provide the spring retaining clip 53.

The casing 41 is adapted to be secured directly below the steering wheel of an automobile through the medium of the detachable clamp 54 which is detachably secured around the steering column (not shown) and as is clearly shown in Figure 4, this detachable clamp comprises the complementary sections 55 and 56 the respective ends of which are disposed laterally as at 57 and through which extends the securing bolts 58. The intermediate portion of the semicircular section 55 is secured to the inner end of the casing 41 by suitable rivets or the like shown at 58'.

In this manner the operator of the vehicle can readily actuate the switch mechanism without necessitating the removal of his hands from the steering wheel.

The casing 2 is adapted to be secured on an automobile in any suitable manner, and an attaching bracket such as is shown at 59 is carried by the rear wall of the casing.

It will thus be seen from the foregoing description that I have provided an automobile signal which will visually display indicating means which will allow approaching vehicles to ascertain the course of direction which is to be pursued by an automobile on which the signal is mounted.

The simplicity in which my improved automobile signal is constructed enables the same to be readily and easily attached to an automobile without necessitating any alterations, and furthermore the partition plates will prevent the electric lamp in one compartment illuminating any of the other compartments.

While I have shown the preferred embodiment of my invention, it is to be understood that minor changes in the size, shape, and arrangement of parts may be resorted to without departing from the spirit of the invention and the scope of the appended claim.

Having thus described the invention, what I claim as new and desire to secure by Letters Patent is:—

In an automobile signal, a casing having its front face open, a face plate therefor, a plug of insulating material fixed in the rear of the casing, a pair of intersecting partition plates in the casing, means for securing the partition plates in the casing so as to divide the casing into a plurality of compartments, the adjacent side edges of the plates adjacent the points of intersection being provided with notches to accommodate the plug, sockets in the compartments, and spring contact arms secured to the plug and extending into the compartments and terminating at the sockets.

In testimony whereof I affix my signature.

FRANK BARNES.